Figure 1:
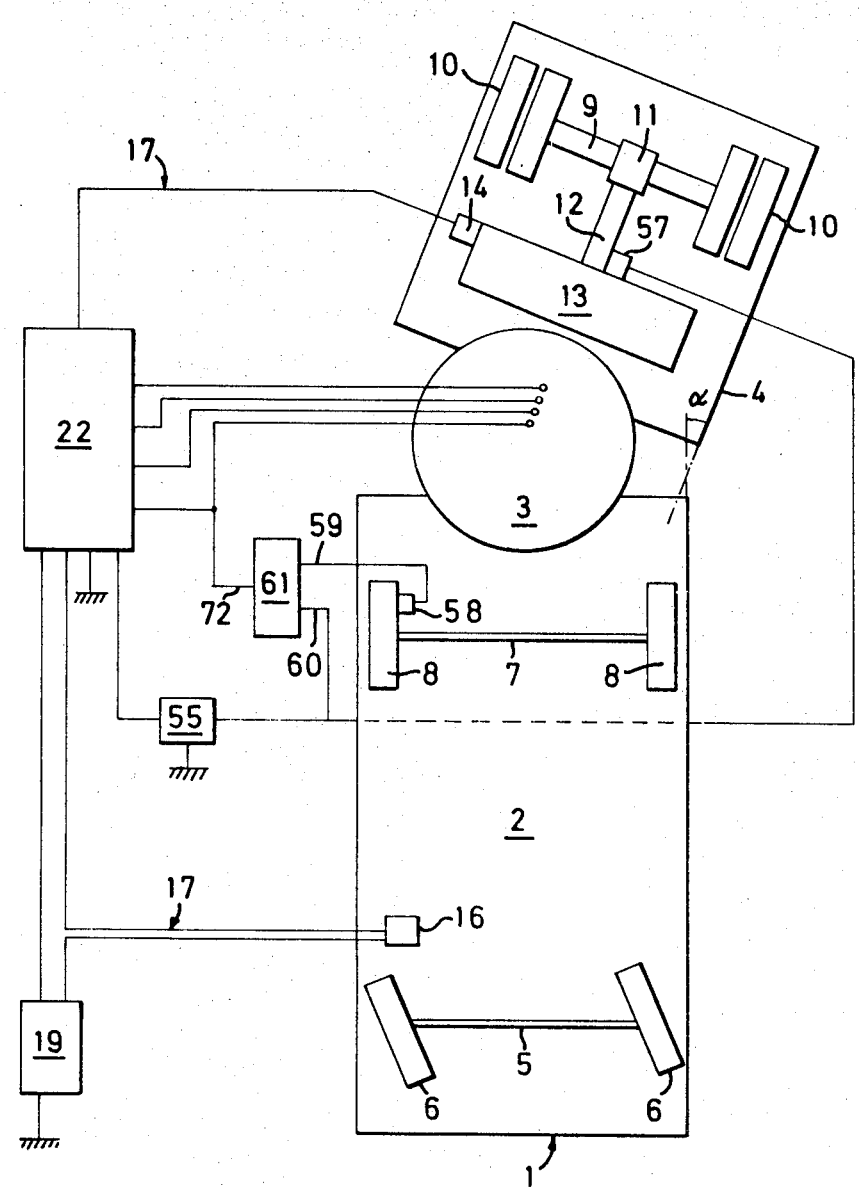

United States Patent [19]

Bergman et al.

[11] 4,405,145
[45] Sep. 20, 1983

[54] ARRANGEMENT FOR LIMITING UNCONTROLLED ARTICULATION MOVEMENTS AT THE PICOT BETWEEN VEHICLE UNITS IN ARTICULATED VEHICLES, PREFERABLY ARTICULATED BUSES

[75] Inventors: Hans I. Bergman; Björn D. Nyman, both of Katrineholm, Sweden

[73] Assignee: Saab-Scania Aktiebolag, Sodertalje, Sweden

[21] Appl. No.: 279,013

[22] Filed: Jun. 30, 1981

[30] Foreign Application Priority Data

Jul. 3, 1980 [SE] Sweden ............... 8004928

[51] Int. Cl.³ ............ B62D 53/00; B60K 26/00
[52] U.S. Cl. ................. 280/432; 180/14 A; 180/197
[58] Field of Search .......... 280/432, 474, 423 R, 280/442, 446 R, 446 B, 457; 180/14 A, 14 D, 197; 188/112, 142

[56] References Cited

U.S. PATENT DOCUMENTS

| 3,227,235 | 1/1966 | Budzich et al. | 180/14 A |
|---|---|---|---|
| 3,486,799 | 12/1969 | Greentree | 280/432 X |
| 3,584,698 | 7/1971 | Larson | 180/14 A |
| 3,817,341 | 6/1974 | Greene | 180/14 D |
| 3,865,208 | 2/1975 | Crawshay | 180/6.48 |
| 3,938,611 | 2/1976 | Bertolasi | 180/197 |
| 4,065,148 | 12/1977 | Koroknay et al. | 280/432 |
| 4,122,390 | 10/1978 | Kollitz et al. | 280/432 X |
| 4,344,640 | 8/1982 | Ratsko et al. | 280/432 |
| 4,366,966 | 1/1983 | Ratsko et al. | 280/432 |

FOREIGN PATENT DOCUMENTS

| 15176 | 1/1980 | European Pat. Off. | 280/432 |
|---|---|---|---|
| 857893 | 12/1952 | Fed. Rep. of Germany . | |
| 921304 | 12/1954 | Fed. Rep. of Germany . | |
| 925206 | 4/1961 | United Kingdom . | |
| 1180365 | 6/1968 | United Kingdom . | |
| 2082523 | 3/1982 | United Kingdom | 180/14 A |

Primary Examiner—Joseph F. Peters, Jr.
Assistant Examiner—Mitchell J. Hill
Attorney, Agent, or Firm—Cushman, Darby & Cushman

[57] ABSTRACT

An arrangement in articulated vehicles for avoiding uncontrolled articulation movements between participating vehicle units, particularly occurring in vehicles equipped with driving wheels on the trailing unit where driving takes place as a thrusting movement. Power transmitted to the driving wheels is limited in response to different operating conditions for the vehicle units, represented by articulation angles and/or different wheel speeds on leading and trailing vehicle units. By means of sensors sensing current operational conditions, circuits comparing sensor signals and power control means controlling the driving unit for limiting the power transmitted to the driving wheels in response to the signals, uncontrolled articulation movements are avoided.

9 Claims, 4 Drawing Figures

ARRANGEMENT FOR LIMITING UNCONTROLLED ARTICULATION MOVEMENTS AT THE PICOT BETWEEN VEHICLE UNITS IN ARTICULATED VEHICLES, PREFERABLY ARTICULATED BUSES

The present invention relates to an arrangement in articulated vehicles, preferably articulated buses, for limiting during travel uncontrolled articulation movements between a leading vehicle unit and a trailing vehicle unit articulatedly connected thereto and equipped with driving wheels, which are driven by means of a driving unit under the control of at least one power control means activated by the vehicle driver.

In articulated vehicles, e.g. articulated buses, there is a risk during abnormal driving conditions that the participating vehicle units are subjected to uncontrolled articulation movements relative to each other. This can result in that the vehicle units can unchecked fold up towards a centre of curvature, so-called jack-knifing, or also out from said centre of curvature, the back end then yawing out. Such uncontrolled articulation movements can cause dangerous traffic situations, not in the least because the size of an articulated vehicle generally does not allow the possibility of any correction requiring space. The risk of uncontrolled articulation movements is particularly noticeable in articulated vehicles with the drive arranged on the most rearward vehicle axle, since the drive takes place as a thrusting movement.

A plurality of different forms of articulation locks have been developed with the intention of limiting the occurrence of uncontrolled articulation movement in articulated vehicles, such locks being intended for activation when critical situations occur. One of the most well-known arrangements in this respect is based on placing hydraulic cylinders between the vehicle units, usually one on either side of the longitudinal axis of the combination and a pivot plate or the like connecting the vehicle units. The respective ends of the hydraulic cylinders are attached to the vehicle units, and the cylinders communicate with each other via a connection means. Hydraulic oil flows through said means to and from the respective cylinders in response to the angular attitude of the vehicle units. This angle, i.e. the angle between the central axes of the vehicle units, will hereinafter be referred to as the articulation angle. A blocking means is activated in the case where the articulation angle changes abnormally rapidly; this means completely or partially blocking flow in the connection means and thereby preventing further change in the articulation angle.

Sensing the rate of change of the articulation angle by means of sensing the speed of the hydraulic oil flow involves difficulties in selecting a suitable critical limiting value for when activation of the blocking means shall take place. During normal driving conditions, also including driving through curves at both low and high speed, the system must not be too sensitive, but at the same time it must be sufficiently sensitive for rapidly reacting to abnormal articulation. In certain cases, such uncontrolled articulation movement can also take place relatively slowly. These conflicting conditions have resulted in that known practical forms of articulation blocking systems are often pre-programmed with limiting values which are compromises for when the articulation blocking system shall be activated. The result of this is that in certain driving conditions such an articulation blocking system is activated when it should not be, and vice versa.

Another principle solution is based on arranging means sensing the articulation angle between the vehicle units and means sensing the vehicle steering angle. Signals corresponding to these quantities are compared, and in the cases where the articulation angle is greater than is justified by the appropriate steering angle, blocking means are activated to prevent continued articulation.

This system as well has certain drawbacks, however. At the exit from a sharp turn or during a turn at a street crossing, the steering angle will decrease more rapidly than the articulation angle. This results in that the articulation blocking means will be activated in the intended manner and prevent continued increase of the articulation angle. In such conditions, it is usual that the driver begins to accelerate the vehicle as soon as the leading vehicle unit has passed the curve or crossing, in spite of the articulation angle being relatively large in this situation. Where friction between the vehicle wheels and the ground is small, a situation of this kind can result in that the tendency of the trailing vehicle unit to go straight forwards causes the wheels on the rear axle of the leading vehicle unit to be subjected to gliding. The activated articulation blocking system will only prevent continued increase of the articulation angle in this case but will not prevent the trailing vehicle unit from executing an uncontrolled movement.

Under the same driving conditions, it is also probable that the driving rear wheels spin free and that the back end of the vehicle glides without control in the transverse direction.

Common to the above-mentioned known articulation blocking arrangements is that they are substantially designed solely to prevent increase in an articulation angle, while they do not block for a reduction of this angle.

The present invention has the object of solving the problem stated for articulated vehicles, preferably articulated buses with driving on the rear axle, in a manner avoiding the drawbacks of known solutions. The inventive arrangement is thus substantially distinguished in that at least one movement-sensing transducer senses a parameter representing a driving condition for the trailing vehicle unit relative to the leading vehicle unit, that such a transducer gives an output signal to a comparator circuit in which the signal is compared with a reference signal, and that the comparator circuit gives an output signal to the power-controlling means in response to said comparison, this signal limiting the power available to the driving wheels in proportion to signal level.

By maximizing the driving power of the driving wheels in response to a driving condition between the vehicle units, it is possible to limit the force which tends to increase the articulation angle.

In an advantageous embodiment of the invention, the operational relationship between the vehicle units is sensed by sensing the articulation angle, and in another advantageous embodiment of the invention, the operational relationship is sensed by comparing wheel speeds for the trailing and leading vehicle units, i.e. on a driven and an undriven vehicle wheel. - These two embodiments can also be combined with each other into a total solution which provides reliable articulation angle control under the majority of conceivable driving conditions.

Figure 2:
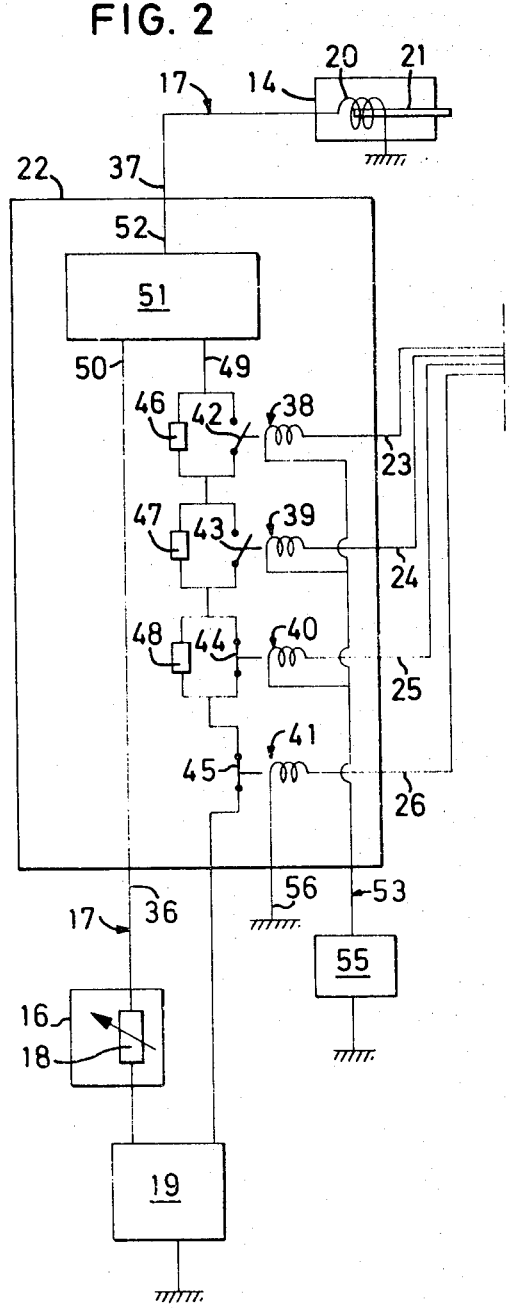
Figure 3:
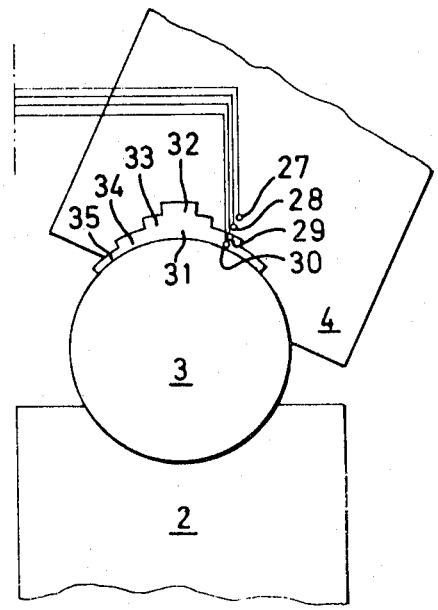
Figure 4:
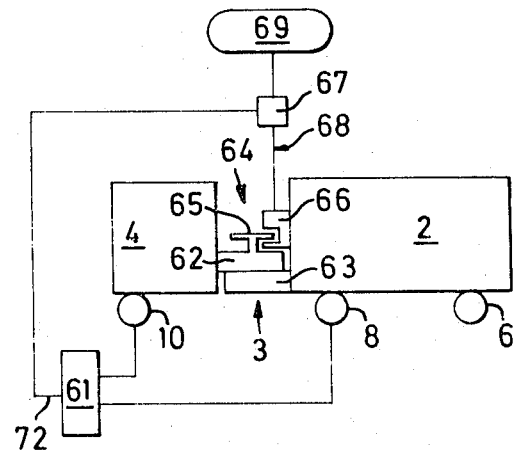

Other properties and advantages distinguishing the invention will be apparent from the following claims and from the examples described below. The description is made while referring to the appended drawings, in which FIG. 1 schematically illustrates a principle configuration of an articulated bus, FIG. 2 illustrates a circuit diagram for a control means, FIG. 3 illustrates an articulation angle sensor, and FIG. 4 illustrates a principle embodiment of an articulation lock.

An articulated bus 1 comprises a leading vehicle unit 2 and a trailing vehicle unit 4, these units being articulatedly connected to each other via a pivot 3. The leading vehicle unit 2 includes a forward axle 5 carrying steerable wheels 6 and an intermediate axle 7 carrying non-steerable, free-rolling wheels 8. The trailing vehicle unit 4 includes a rear axle 9 carrying driving wheels 10, which are conventionally connected to a driving unit 13 via a differential gear 11 and a cardan shaft 12 for power transmission. Said driving unit 13 includes an internal combustion engine to which there is fixed an automatically controlled gearbox with associated control and regulating means. The driving unit 13 is controlled by a transmission power control means 14 which in turn is actuated by an accelerator pedal 16 arranged at the driver's seat in the leading vehicle unit 2. Translation of the accelerator pedal 16 movement to the power control means 14, which in practice constitutes a fuel injection pump, is done electrically via a wire 17. On actuation of the pedal 16, a variable electric resistor 18 is actuated, and this is connected to a DC source 19, according to FIG. 2.

At the power control means 14 the wire 17 is connected to a solenoid 20, disposed for coaction with a spring-biased armature 21 on a regulating rod (not shown) on the engine injection pump. In response to the voltage applied to the solenoid 20, the armature 21 and thereby the injection pump-regulating rod, will assume different positions, corresponding to different power delivery from the driving unit 13.

A control means 22 is connected between the resistor 18 and the power-control means 14. In certain driving conditions, more closely described below, the control means 22 solely constitutes a connecting link in the wire 17, which translates the accelerator pedal position 16 to the power-control means 14. Such an operating condition can be present, for example, when the bus 1 is driven straight forward at moderate speed. During other operating conditions the control means 22 can interrupt said connection to control in response to other operational parameters the power control means 14, independent of the position of the accelerator pedal 16. For this purpose, the control means 22 is provided with a plurality of inputs 23,24,25,26 for electrical signals from sensing means for other operational parameters. In the present example, the control means 22 is formed with four inputs 23,24,25,26, which are all connected to position sensors 27,28,29,30 placed at the pivot 3 connecting the leading vehicle unit 4 and trailing vehicle unit 2, respectively. Said sensors 27,28,29,30 are intended to sense an articulation angle α between vehicle units 2 and 4.

As will be seen from FIG. 4, the pivot 3 comprises two pivot plates 62,63, one being an upper plate 62 rigidly connected to the trailing vehicle unit 4 and the other a lower plate 63 rigidly connected to the leading vehicle unit 2. These plates 62,63 are in mutual gliding relationship, and in a horizontal direction they are fixed to each other via a central vertical shaft (not shown) about which the plates 62,63 can turn relative each other, and thus the units 2,4 as well.

Sensing an angle between the vehicle units 2,4, a so-called articulation angle α, is done with four position sensors 27,28,29,30, illustrated in FIG. 3. Said sensors are bar-shaped and of the inductive type. Each of them is connected to a voltage source (not shown) and adapted to give a positive voltage when not sensing a metallic object, and a zero voltage otherwise. The four sensors 27–30 are attached to the upper plate 62 which is rigidly connected to the trailing vehicle unit 4, and are placed in a row after each other in a radial direction from the turning centre of the pivot, said row being parallel to the longitudinal axis of the trailing vehicle unit 4. A metallic cam plate 31 is attached to the lower pivot plate 63 and provided with four radial profiles 32,33,34,35 which are over-dimensioned relative to the pivot 3 in FIG. 3. Said profiles 32,33,34,35 are arranged to be sensed during a turning movement, whereby each profile 32–35 can be sensed by one of the four sensors 27–30. The profiles 32–35 occupy differently large angular sectors, and by sensing which of the profiles 32–35 are opposite their respective sensors 27–30, there is obtained an indication of the articulation angle between the vehicle units 2,4. The profile 32 is selected such that a sensor 27 senses when the articulation angle α between the vehicle units is greater than 7°. The remaining profiles 33–35 are selected such that indication is obtained for exceeding the angles 15°, 30° and 47°, respectively. The maximum articulation angle is about 50°.

The cam plate 31 is disposed symmetrically relative to the longitudinal axis of the leading vehicle unit 2, and indication is obtained for the given articulation angles, independent of on which side of the longitudinal axis said angle has been formed.

As will be seen from FIG. 2, each of the four sensors 27–30 is connected to an input 23–26 on the control means 22, which also includes an input 36 for connection to the variable resistor 18 at the accelerator 16, and an output 37 for connection to the power control means 14.

Each of the four inputs 23–26 from the sensors is provided with a relay 38,39,40,41, each regulating one of four switches 42,43,44,45 in a connection between the DC voltage source 19 and a signal-comparing circuit 51. Such a switch 42–45 is adapted for being open when a voltage is applied to its corresponding input 23–26. Three of the relays 38–40 incorporated in the control means 22 are connected to a common earth line 53 which also includes a switch 55 allowing connection to earth only when the bus 1 is driven faster than a predetermined speed, e.g. 7 km/h. The fourth relay 41 however is continuously connected to earth via a separate line 56.

The three switches 42,43,44 are each connected in parallel with a resistor 46,47,48, respectively, which enables connection of one or more of these three series-connected resistors, depending on how many of the inputs 23–25 have been activated. The fourth relay 41 can break the connection between the DC source 19 and the comparison circuit 51 by means of a switch 45. In FIG. 2 the switch 45 has assumed a closed position and two relays 38,39 are activated. This signifies that the switches 42,43 are open and that their parallel-circuited resistors cause a potential drop in the common connection between the DC source 19 and an input 49 to the comparison circuit 51. A second input 50 in said comparison circuit 51 is connected to the input 36 of the control means 22, and an output 52 on the comparison circuit 51 is connected to the control means output 37. Voltages coming via the resistor 18 of the accelerator pedal 16 and via the series-connected resistors 46,47,48 are compared in the comparison circuit 51, and the voltage which is then lowest is fed out to the power control means 14 via the output 52.

Sensing the speed of the bus 1 is done by sensing the r.p.m. of the output shaft of the driving unit 13. This output shaft is connected to the cardan shaft 12 and is, via a gear (not shown), also connected to a speed sensor 57 in the form of an electric AC generator, the signal frequency of which constitutes a measure of the r.p.m. By means of suitable signal processing, this signal is converted to represent the speed of the bus 1. The signal also constitutes a parameter which expresses the average speed of the driving wheels 10, and the signal controls the speed-responsive earthing switch 55 so that the relays 38,39,40 can be circuited to earth via the line 53 for vehicle speeds exceeding the exemplified vehicle speed of 7 km/h. For lower speeds the earth connection is interrupted, resulting in that the relays 38,39,40 cannot be activated irrespective of whether there are signals on the inputs 23,24,25 or not. As previously mentioned, the fourth relay is continuously earthed via the earth connection 56.

The described arrangement has the following function. When driving substantially straight forwards and/or at speeds below 7 km/h, the three first relay 38,39,40 cannot be activated. The voltage supplied to the comparison circuit 51 on the input 50 from the accelerator pedal 16 will thus be lower than the voltage applied to the input 49 from the series-connected resistors 46,47,48. Where the resistance of the variable resistor 18 is presumed to be equal to zero for a full-throttle position of the accelerator pedal 16, the voltage will be equal on the two inputs 49,50 to the comparator 51. This signifies that the position of the accelerator pedal 16 controls what voltage is fed out from the control means 22 for controlling the transmittable power of the driving unit 13.

When driving with small articulation angles between the vehicle units 2,4, i.e. within the angular range of 7°–15°, the sensor 27 in the pivot 3 is activated, as is the speed-responsive earthing switch 55, with the result that the corresponding relay 38 in the control means 22 switches in the resistor 46. This results in that the output voltage from the control means 22 is reduced to a given value, and that the power supplied by the driving unit 13 is reduced correspondingly.

When driving with medium-sized articulation angles between the vehicle units 2,4, i.e. within the angular range of 15°–30°, a further sensor 28 is activated analogously, and furthermore another relay 39 in the control means 22. As a result, a further resistor 47 is switched in, and the output voltage from the control means 22 is reduced. - For an even greater articulation angle, i.e. greater than 30°, the maximum output voltage is reduced still further by a further resistor 48 being switched in analogously.

For driving causing the greatest possible articulation angle, i.e. greater than 47°, the fourth relay 41 in the control means 22 is activated irrespective of vehicle speed, with the result that no voltage is applied to the input 49 on the comparator 51. The power control means 14 thereby assumes a state corresponding to idling, and the driving unit r.p.m. is also reduced to idling r.p.m.

On application of the inventive arrangement, the greatest possible power delivered from the driving unit 13 will be limited by the articulation angle α current between the vehicle units 2,4. If the position of the accelerator pedal 16 corresponds to a lower desired power, the described reduction of maximum power does not have any practical effect.

The described arrangement can be modified and supplemented so that other operation parameters than the articulation angle between the vehicle units 2,4 can also control the maximum power output of the driving unit 13. Such an operational parameter can be the difference in speed between a driven wheel 10 and a non-driven wheel 6,8. For this purpose one of the wheels of the intermediate axle 7 is provided with a speed sensor 58 which sends voltage pulses at a frequency corresponding to the speed. This kind of speed sensor 58 in vehicle wheels is well-known within the art in conjunction with so-called non-locking brakes. This sensor 58 is connected to an input 59 on a comparator 61, which is also provided with a second input 60 connected to the previously described speed sensor 57. The output 72 on the comparator 61 is connected to the fourth input 26 of the control means and can thereby actuate the control means 22 to send a voltage corresponding to idling for the driving unit 13.

A signal corresponding to the average speed of the driven wheels 10 is thus compared in the comparator 61 with a signal corresponding to the speed of a non-driven wheel 8. If these speeds have a discrepancy of more than 10%, this is an indication that one of the wheels 8,10 is spinning and/or gliding. In such a situation the comparator 61 sends an output signal activating the relay 41 in the control means 22, the driving unit 13 being caused to idle until the current operating condition has been altered. The comparator 61 is adapted so as not to react for the minor differences in speed which can occur in normal curve-taking or the like. This modified embodiment with sensing of wheel speeds for driven and non-driven vehicle wheels used separately as well as in combination with the method above for sensing articulation angle.

If a bus is equipped with a so-called automatic brake control system, certain parts of said system can to advantage be combined with the present invention to detect wheel spin. In such a case wheel spin for each individual wheel on the trailing vehicle unit can be detected either by detecting a speed difference or by detecting a speed change rate.

In a still further modified embodiment, the signal from the comparator 61 can be used to control an articulation brake known per se. This brake can be of the kind prevalent in the art for preventing a trailing vehicle jack-knifing on a prime mover during braking. Such an articulation brake 64, which is principally illustrated in FIG. 4, comprises a brake disc 65 rigidly attached to the upper pivot plate 62, and a brake calliper 66 embracing the disc 65 and being rigidly attached to the lower pivot plate 63 and the leading vehicle unit 2. The brake calliper 66 includes compressed air-operated braking pads (not shown) and is connected to a compressed-air source 69 via a conduit 68. In the conduit 68 there is a solenoid valve 67 connected to the output 72 of the comparator 61. When the comparator 61 senses a wheel-spin condition, said comparator 61 gives an output signal activating the solenoid valve 67. Said valve opens compressed-air communication with the compressed-air source 69, and air flows to the brake calliper 66 via the conduit 68. The braking pads are brought into engagement with the brake disc 65, movement between the two pivot plates 62,63 and the two vehicle units 2,4 thus being braked and/or locked.

The inventive arrangement thus results in that the greatest transmittable power from the driving unit 13 can be reduced in driving conditions which are critical for uncontrolled articulation angles between the vehicle units 2,4. For large articulation angles the power reduction is greater than for small ones. By supplementing the power reduction with sensing of wheel spin, an indication of risk for uncontrolled articulation angle can be obtained at a very early stage in situations when driving surface conditions are slippery. By the power being reduced on such indications, wheel spin will also cease earlier than what would otherwise be the case.

Within the scope of the following claims, the invention can be formed differently from what has been disclosed in the above example. Accordingly, the control means 22 can to advantage be formed as an electronic control system in accordance with known semiconductor techniques and/or with the aid of integrated circuits. In such applications it is often more simple to utilize signals in the form of zero voltages, i.e. a signal is considered sent when a connection is earthed.

Instead of a stepwise control of the power control means 14, infinitely variable control can be arranged, and it is also possible to allow the sensors 27,28,29,30 to send continuous signals proportional to the sensed parameters. Furthermore, the power control means 14 can comprise a DC engine instead of a solenoid 20 with an armature 21, the output torque of the engine being proportional to the voltage applied to it. This engine can then be caused to actuate a fuel-injection pump with the aid of a suitable mechanism.

What we claim is:

1. An arrangement in articulated vehicles, preferably articulated buses, for limiting uncontrolled articulation movements between a leading vehicle unit and a trailing vehicle unit articulatedly connected thereto and equipped with driving wheels which are driven by means of a driving unit under the control of at least one activated power control means, characterized in that movement-sensing sensors sense parameters representing operating conditions for the leading and trailing vehicle units, that at least one of the sensors gives an output signal to a comparison means, in which the output signal is compared with a reference signal, and that the comparison means gives an output signal in response to a comparison between the output signal from the sensor and the reference signal to the power control means which limits the power transmittable to the driving wheels.

2. An arrangement as claimed in claim 1, characterized in that an accelerator pedal sensor, actuable by a vehicle driver, is adapted for sending the reference signal to the comparison means.

3. An arrangement as claimed in claim 2, characterized in that one of said sensed parameters constitutes an articulation angle between the vehicle units.

4. An arrangement as claimed in claim 3, characterized in that a plurality of the movement-sensing sensors are adapted to give output signals when the articulation angle exceeds a predetermined articulation angle for each of said movement-sensing sensors, and that in response thereto the comparison means stepwise give output signals that regulate transmittable power to the driving wheels.

5. An arrangement as claimed in claim 4, characterized in that one of said movement-sensing sensors is adapted for sensing when the articulation angle exceeds a maximum value, and that in response thereto the comparison means gives an output signal that limits the transmittable power from the driving unit to a value corresponding to idling power.

6. An arrangement as claimed in claim 1, characterized in that one of said sensed parameters constitutes speed signals from vehicle wheels on the leading and trailing vehicle units, said speed signals being supplied to the comparison means.

7. An arrangement as claimed in claim 6, characterized in that the comparison means is adapted to give output signals for a discrepancy between the speeds of the vehicle wheels of more than a predetermined value, and that in response thereto the power control means reduces the transmittable power of the driving unit to a value corresponding to idling power.

8. An arrangement as claimed in claim 7, characterized in that an output signal from the comparison means corresponding to a predetermined discrepancy between a driven and a non-driven vehicle wheel activates an articulation brake limiting articulation movements for the vehicle units.

9. An arrangement as claimed in claim 1, characterized in that sensors are adapted for sensing an articulation angle between the vehicle units, and that sensors are adapted for sensing a difference in speed between vehicle wheels on the leading and the trailing vehicle unit.

* * * * *